United States Patent
Park et al.

(10) Patent No.: US 9,255,179 B2
(45) Date of Patent: Feb. 9, 2016

(54) COPOLYCARBONATE RESIN AND ARTICLE INCLUDING THE SAME

(71) Applicant: LG CHEM, LTD., Seoul (KR)

(72) Inventors: Jung Jun Park, Daejeon (KR); Min Jeong Kim, Daejeon (KR); Un Ko, Daejeon (KR); Ki Jae Lee, Daejeon (KR); Moo Ho Hong, Daejeon (KR); Hyong Min Bahn, Daejeon (KR); Byoung Kyu Chun, Daejeon (KR); Young Young Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/654,336

(22) PCT Filed: Sep. 16, 2014

(86) PCT No.: PCT/KR2014/008605
§ 371 (c)(1),
(2) Date: Jun. 19, 2015

(87) PCT Pub. No.: WO2015/041441
PCT Pub. Date: Mar. 26, 2015

(65) Prior Publication Data
US 2015/0344623 A1 Dec. 3, 2015

(30) Foreign Application Priority Data

Sep. 17, 2013 (KR) .................. 10-2013-0111878
Sep. 5, 2014 (KR) .................. 10-2014-0118830

(51) Int. Cl.
*C08G 64/38* (2006.01)
*C08G 64/16* (2006.01)
*C08G 64/30* (2006.01)
*C08G 77/18* (2006.01)
*C08L 69/00* (2006.01)

(52) U.S. Cl.
CPC .......... *C08G 64/1666* (2013.01); *C08G 64/307* (2013.01); *C08G 64/38* (2013.01); *C08G 77/18* (2013.01); *C08L 69/00* (2013.01); *C08L 2201/10* (2013.01)

(58) Field of Classification Search
None
See application file for complete search history.

(56) References Cited

U.S. PATENT DOCUMENTS 5,130,460 A * 7/1992 Kamei ................. C07F 7/0852
556/449
5,243,009 A * 9/1993 Rich .................... C08G 77/448
528/26

(Continued)

FOREIGN PATENT DOCUMENTS

JP 0873882 A 3/1996
JP 10204179 A 8/1998
JP 3293726 B2 6/2002

(Continued)

*Primary Examiner* — Robert S Loewe
(74) *Attorney, Agent, or Firm* — Dentons US LLP

(57) ABSTRACT

According to the present disclosure, a copolycarbonate being economically prepared, and having improved low-temperature impact strength with improved transparency and flowability which are conflicting properties with each other, simultaneously, and a molded article including the same, may be provided.

15 Claims, 2 Drawing Sheets

(56) References Cited

U.S. PATENT DOCUMENTS

| | | | |
|---|---|---|---|
| 5,552,506 A * | 9/1996 | Ebbrecht | C09D 183/06 522/99 |
| 5,726,271 A * | 3/1998 | Furukawa | C08G 77/12 528/15 |
| 6,630,562 B2 * | 10/2003 | Ogawa | C08G 64/085 528/10 |
| 7,232,865 B2 * | 6/2007 | DeRudder | C08G 64/186 525/446 |
| 2007/0129492 A1 | 6/2007 | Colborn et al. | |
| 2012/0252961 A1 * | 10/2012 | Sybert | C08L 83/10 524/537 |
| 2012/0283378 A1 * | 11/2012 | Shoshi | C07F 7/0852 524/556 |

FOREIGN PATENT DOCUMENTS

| | | |
|---|---|---|
| JP | 2011236287 A | 11/2011 |
| KR | 1020120050968 A | 5/2012 |
| KR | 1020120098769 A | 9/2012 |
| KR | 101205171 B1 | 11/2012 |
| KR | 1020130047332 A | 5/2013 |
| KR | 1020130078738 A | 7/2013 |
| KR | 1020130090359 A | 8/2013 |

* cited by examiner

COPOLYCARBONATE RESIN AND ARTICLE INCLUDING THE SAME

This application is a National Stage Entry of International Application No. PCT/KR2014/008605, filed Sep. 16, 2014, and claims the benefit of Korean Application No. 10-2013-0111878, filed on Sep. 17, 2013, and Korean Application No. 10-2014-0118830, filed on Sep. 5, 2014 all of which are hereby incorporated by reference in their entirety for all purposes as if fully set forth herein.

TECHNICAL FIELD

The present disclosure relates to a copolycarbonate resin and an article including the same, and more particularly, to a copolycarbonate resin being more economically prepared, and having improved low-temperature impact strength with improved transparency and flowability which are conflicting properties with each other, simultaneously, and an article including the same.

BACKGROUND ART

A polycarbonate resin is prepared by condensation polymerization of an aromatic diol such as bisphenol A and a carbonate precursor such as phosgene, has excellent impact strength, dimensional stability, thermal resistance and transparency, and is applied to a wide range of fields such as exterior materials of electrical and electronic products, automotive parts, construction materials, optical components, and the like.

Recently, many attempts have been made to obtain desired physical properties by copolymerizing two or more aromatic diols different from each other to introduce a monomer having a different structure to a polycarbonate main chain, in order to apply this polycarbonate resin to more various fields.

In particular, a study to introduce a polysiloxane structure to a polycarbonate main chain has proceeded, but it is problematic that all techniques has high production costs, and as chemical resistance or impact strength, particularly low-temperature impact strength is increased, transparency or the like is decreased, and as transparency is improved, chemical resistance, impact strength or the like is reduced.

DISCLOSURE

Technical Problem

In order to solve the problems of the prior arts as described above, an object of the present disclosure is to provide a copolycarbonate resin being economically prepared, and having improved low-temperature impact strength with improved transparency and flowability which are conflicting properties with each other, simultaneously, and an article including the same.

The above and other objects of the present disclosure may be all achieved by the following description.

Technical Solution

In one general aspect, a copolycarbonate resin comprises an aromatic diol compound, a carbonate precursor and a siloxane compound which are polymerized, wherein the siloxane compound is a mixture of a compound represented by following Chemical Formula 1:

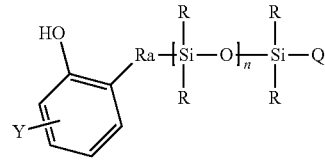

[Chemical Formula 1]

wherein R is independently hydrogen or an alkyl group having 1 to 13 carbon atoms; Ra is an alkylene group having 1 to 10 carbon atoms; Y is an alkyl group having 1 to 6 carbon atoms, hydrogen (H), halogen, a hydroxy group, an alkoxy group or an aryl group; -Q is —OH, —OR''' or

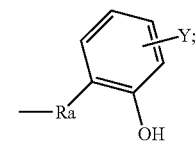

n is an integer of 1 to 99; and R''' is an alkyl group having 1 to 12 carbon atoms;

and a compound represented by following Chemical Formula 2:

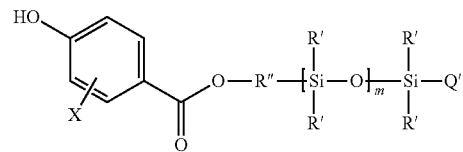

[Chemical Formula 2]

wherein R' is independently hydrogen or an alkyl group having 1 to 13 carbon atoms; R'' is an alkyl group having 1 to 10 carbon atoms; X is an alkyl group having 1 to 6 carbon atoms, hydrogen (H), halogen, a hydroxy group, an alkoxy group or an aryl group; -Q' is —OH, —OR''' or

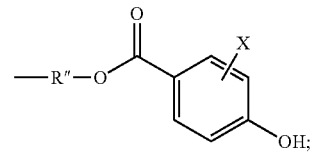

m is an integer of 1 to 99; and R''' is an alkyl group having 1 to 12 carbon atoms.

Further, the present disclosure provides an article including the copolycarbonate resin.

Advantageous Effects

As described above, a copolycarbonate resin being economically prepared, and having improved low-temperature impact strength and transparency which are conflicting properties with each other, simultaneously, and an article including the same, may be provided, according to the present disclosure.

BRIEF DESCRIPTION OF DRAWINGS

The above and other objects, features and advantages of the present disclosure will become apparent from the following description of preferred embodiments given in conjunction with the accompanying drawings, in which.

BEST MODE

Figure 1:
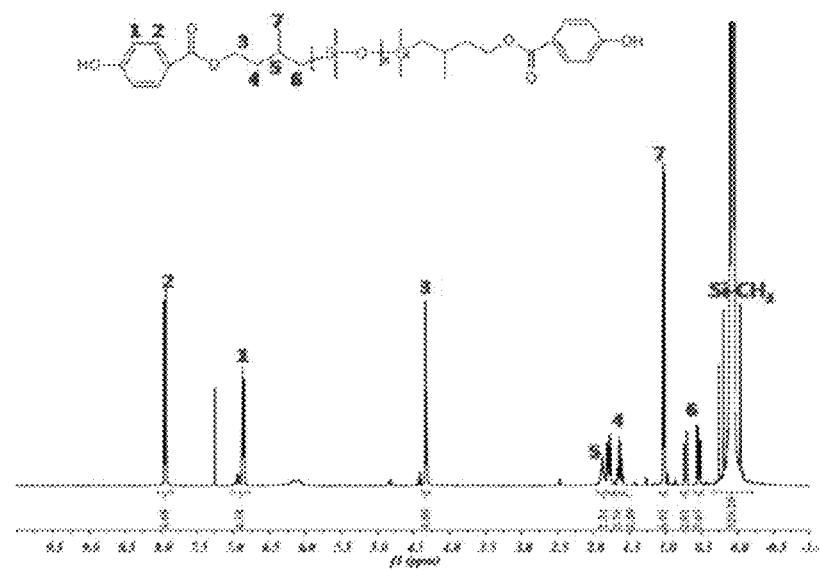
FIG. 1 is a $^1$H NMR spectrum of terminal-modified polydimethylsiloxane with 2-methyl-1-butene hydroxybenzoate (MBHB-PDMS).
Figure 2:
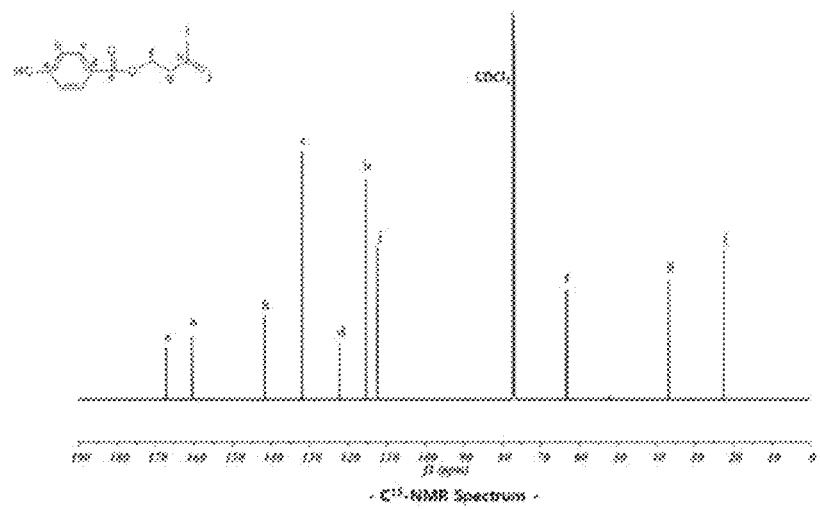
FIG. 2 is a $^{13}$C NMR spectrum of 2-methyl-1-butene hydroxybenzoate (MBHB).
Figure 3:
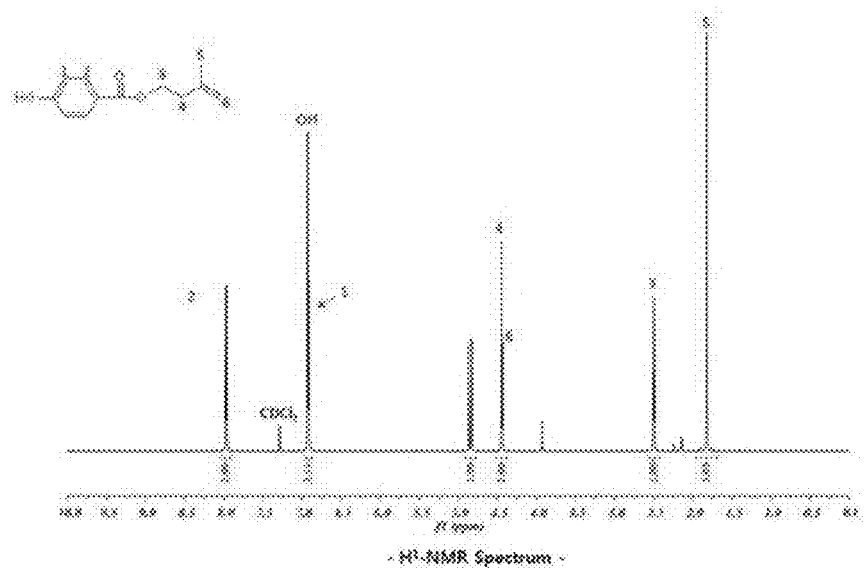
FIG. 3 is a $^1$H NMR spectrum of 2-methyl-1-butene hydroxybenzoate (MBHB).
Figure 4:
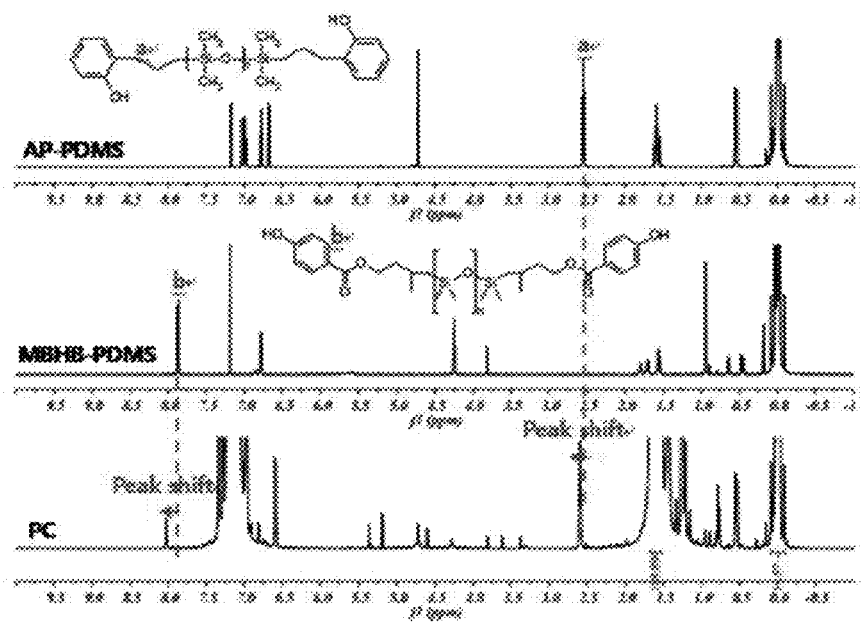
FIG. 4 is $^1$H NMR spectra of terminal-modified polydimethylsiloxane with 2-allylphenol (AP-PDMS), terminal-modified polydimethylsiloxane with 2-methyl-1-butene hydroxybenzoate (MBHB-PDMS), and polycarbonate (PC) polymerized therefrom, arranged in order from top to bottom, and may confirm monomers derived from AP-PDMS and MBHB-PDMS in PC polymerized from AP-PDMS and MBHB-PDMS.

Hereinafter, the present disclosure will be described in detail.

The copolycarbonate resin of the present disclosure is copolycarbonate comprising an aromatic diol compound, a carbonate precursor and a siloxane compound which are polymerized, wherein the siloxane compound is a mixture of a compound represented by following Chemical Formula 1:

[Chemical Formula 1]

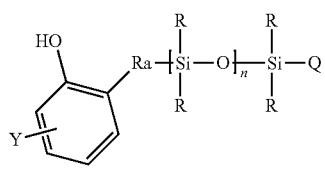

wherein R is independently hydrogen or an alkyl group having 1 to 13 carbon atoms; Ra is an alkylene group having 1 to 10 carbon atoms; Y is an alkyl group having 1 to 6 carbon atoms, hydrogen (H), halogen, a hydroxy group, an alkoxy group or an aryl group; -Q is —OH, —OR''' or

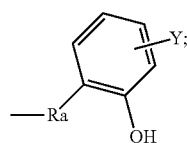

n is an integer of 1 to 99; and R''' is an alkyl group having 1 to 12 carbon atoms;

and a compound represented by following Chemical Formula 2:

[Chemical Formula 2]

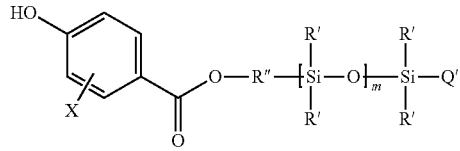

wherein R' is independently hydrogen or an alkyl group having 1 to 13 carbon atoms; R'' is an alkyl group having 1 to 10 carbon atoms; X is an alkyl group having 1 to 6 carbon atoms, hydrogen (H), halogen, a hydroxy group, an alkoxy group or an aryl group; -Q' is —OH, —OR'''' or

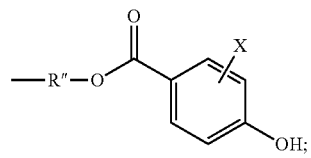

m is an integer of 1 to 99; and R'''' is an alkyl group having 1 to 12 carbon atoms.

An example of R and R' may be an alkyl group having 1 to 6 carbon atoms, or an alkyl group having 1 to 3 carbon atoms.

An example of Ra may be an alkylene group having 1 to 5 carbon atoms, and an alkylene group having 2 to 4 carbon atoms.

An example of R'' may be an alkyl group having 1 to 4 carbon atoms, or 5 to 10 carbon atoms.

An example of n may be an integer of 1 to 40, 1 to 20, or 21 to 40, and within this range, there is an effect of excellent transparency.

An example of m may be an integer of 1 to 50, or 51 to 99, and within this range, there is an effect of excellent ductility.

An example of the weight ratio of the compound represented by above Chemical Formula 1 to the compound represented by above Chemical Formula 2 may be 0.1:99.9 to 99.9:0.1, 1:99 to 99:1, 95:5 to 5:95, 95:5 to 90:10, or 90:10 to 50:50, and within this range, there is an effect of excellent low-temperature impact strength.

The siloxane compound may be included for example, in 0.1 to 20% by weight, 0.5 to 6% by weight, or 1 to 5% by weight, based on total 100% by weight of the aromatic diol compound, the carbonate precursor and the siloxane compound, and within this range, there is an effect of excellent low-temperature impact strength.

An example of the aromatic diol compound may be one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulphide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlororophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane and α,ω-bis[3-(o-hydroxyphenyl)propyl]polydimethylsiloxane, preferably bisphenol A, and in this case, there is an effect of increasing the flowability of the resin.

The aromatic diol compound may be included for example, in 50 to 99.5% by weight, 55 to 90% by weight, or 60 to 85% by weight, based on total 100% by weight of the aromatic diol compound, the carbonate precursor and the siloxane compound, and within this range, there is an effect of excellent intrinsic properties of the polycarbonate resin.

An example of the carbonate precursor may be a compound represented by following Chemical Formula 3:

[Chemical Formula 3]

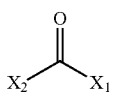

wherein $X_1$ and $X_2$ are independently halogen, a haloalkyl group, a halocycloalkyl group, a haloaryl group, an alkoxy group or a haloalkoxy group; and within this range, there is an effect of imparting intrinsic properties of the polycarbonate resin.

As another example, the carbonate precursor may be one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate, preferably triphosgene or phosgene, and in this case, there is an effect of imparting intrinsic properties of the polycarbonate resin.

The carbonate precursor may be included for example, in 10 to 60% by weight, 15 to 55% by weight, or 20 to 50% by weight, based on total 100% by weight of the aromatic diol compound, the carbonate precursor and the siloxane compound, and within this range, there is an effect of excellent intrinsic properties of the polycarbonate resin.

An example of the compound represented by above Chemical Formula 1 may be a compound represented by following Chemical Formula 4:

[Chemical Formula 4]

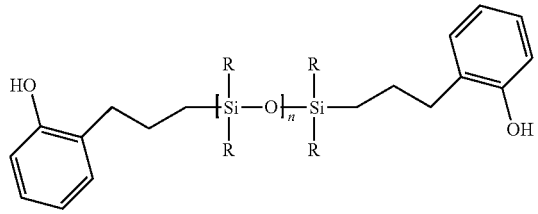

wherein R is independently hydrogen or an alkyl group having 1 to 13 carbon atoms; and n is an integer of 1 to 99; and in this case, there is an effect of excellent transparency and ductility.

An example of the compound represented by above Chemical Formula 2 may be a compound represented by following Chemical Formula 5:

[Chemical Formula 5]

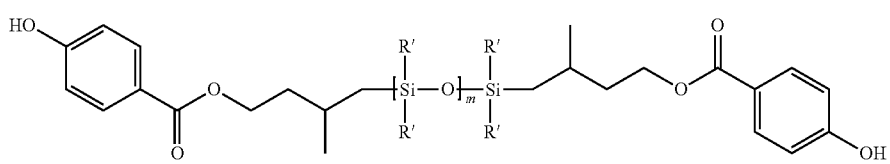

wherein R' is independently hydrogen or an alkyl group having 1 to 13 carbon atoms; and m is an integer of 1 to 99; and in this case, there is an effect of excellent ductility.

An example of m may be an integer of 1 to 50, or 51 to 99, and within this range, there is an effect of excellent ductility.

The copolycarbonate resin may be for example, polymerized by further including a molecular weight controller.

An example of the molecular weight controller may be mono-alkylphenol.

An example of the mono-alkylphenol may be one or more selected from the group consisting of p-tert-butylphenol, p-cumylphenol, decylphenol, dodecylphenol, tetradecylphenol, hexadecylphenol, octadecylphenol, eicosylphenol, docosylphenol and triacontylphenol, preferably para-tert-butylphenol, and in this case, an effect of controlling molecular weight is high.

The molecular weight controller may be included, for example, in 0.01 to 10 parts by weight, 0.1 to 6 parts by weight, or 1 to 5 parts by weight, based on 100 parts by weight of the aromatic diol compound, and within this range, the target molecular weight may be obtained.

The copolycarbonate resin may have, for example, a weight average molecular weight of 30000 to 60000 g/mol, 30000 to 40000 g/mol, or 50000 to 60000 g/mol, and within this range, there is an effect of excellent ductility.

A method of preparing a copolycarbonate resin of the present disclosure may be, for example, an interfacial polymerization method, and in this case, a polymerization reaction at low temperature under normal pressure is possible, and there is an effect of easily controlling molecular weight.

An example of the interfacial polymerization method may be a method of reacting an aromatic diol compound, a carbonate precursor and a siloxane compound, in the presence of an acid binder and an organic solvent.

The interfacial polymerization method may include, for example, adding a coupling agent after pre-polymerization, and then carrying out polymerization, and in this case, a high molecular weight copolycarbonate resin may be obtained.

Other materials used in the interfacial polymerization may not be particularly limited, if they are usable in the polymerization of polycarbonate, and the used amount thereof is adjustable as required.

The acid binder may be, for example, alkali metal hydroxides such as sodium hydroxide and potassium hydroxide, or an amine compound such as pyridine.

Usually the organic solvent may not be particularly limited, if it is a solvent usable in the polymerization of polycarbonate, and may be, for example, halogenated hydrocarbons such as methylene chloride and chlorobenzene.

In the interfacial polymerization, for example, a reaction promoter, for example, a tertiary amine compound such as triethylamine, tetra-n-butylammoniumbromide and tetra-n-butylphosphoniumbromide, a quaternary ammonium compound, a quaternary phosphonium compound may be further used, for promoting the reaction.

The reaction temperature of the interfacial polymerization may be, for example, 0 to 40° C., and the reaction time may be, for example, 10 minutes to 5 hours, and it is preferred to maintain pH, for example, to at least 9, or at least 11 during reaction.

The interfacial polymerization method may be a method of polymerizing by further including the molecular weight controller.

The molecular weight controller may be added, for example, before, during or after polymerization initiation.

The siloxane compound, that is, terminal-modified polyorganosiloxane may be prepared, for example, by a) reacting organodisiloxane and organocyclosiloxane under an acid catalyst to prepare terminal-unmodified polyorganosiloxane; and b) reacting thus-prepared terminal-unmodified polyorganosiloxane with a modifier under a metal catalyst to prepare terminal-modified polyorganosiloxane.

The modifier may be 2-allylphenol or a compound represented by following Chemical Formula 6:

[Chemical Formula 6]

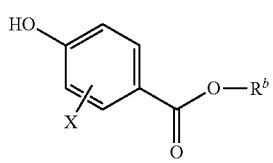

wherein $R^b$ is an alkenyl group having 2 to 10 carbon atoms; and X is an alkyl group having 1 to 6 carbon atoms, hydrogen (H), halogen, a hydroxy group, an alkoxy group or an aryl group.

$R^b$ may be, for example, an alkenyl group having 2 to 5, or 2 to 4 carbon atoms.

The organodisiloxane may be, for example, one or more selected from the group consisting of tetramethyldisiloxane, tetraphenyldisiloxane, hexamethyldisiloxane and hexaphenyldisiloxane.

The organodisiloxane may be used, for example, in 0.1 to 10 parts by weight or 2 to 8 parts by weight, based on 100 parts by weight of organocyclosiloxane.

An example of the organocyclosiloxane may be organocyclotetrasiloxane.

An example of the organocyclotetrasiloxane may be octamethylcyclotetrasiloxane, octaphenylcyclotetrasiloxane, and the like.

The acid catalyst may not be particularly limited, if it is the acid catalyst usable in the synthesis of polyorganosiloxane, and for example, may be one or more selected from the group consisting of $H_2SO_4$, $HClO_4$, $AlCl_3$, $SbCl_5$, $SnCl_4$ and acid clay.

The acid catalyst may be used, for example, in 0.1 to 10 parts by weight, 0.5 to 5 parts by weight, or 1 to 3 parts by weight, based on 100 parts by weight of organocyclosiloxane.

The metal catalyst may not be particularly limited, if it is the metal catalyst usable in the terminal modification reaction of polysiloxane, and for example, may be a Pt catalyst.

The Pt catalyst may not be particularly limited, if it is the Pt catalyst usable in polyorganosiloxane synthesis, and for example, may be one or more selected from the group consisting of an Ashby catalyst, a Karstedt catalyst, a Lamoreaux catalyst, a Speier catalyst, $PtCl_2(COD)$, $PtCl_2(benzonitrile)_2$, and $H_2PtBr_6$.

The metal catalyst may be used, for example, in 0.001 to 1 parts by weight, 0.005 to 0.1 parts by weight, or 0.01 to 0.05 parts by weight, based on 100 parts by weight of polyorganosiloxane.

The modifier may be used, for example, in 0.1 to 20 parts by weight, 1 to 15 parts by weight, or 5 to 12 parts by weight, based on 100 parts by weight of polyorganosiloxane.

The reaction of step a) may be carried out at 50 to 70° C. for 1 to 6 hours.

The reaction of step b) may be carried out at 80 to 100° C. for 1 to 5 hours.

A molded article of the present disclosure is characterized by including the copolycarbonate.

An example of the molded article may be an injection molded article.

The molded article may further include, for example, one or more selected from the group consisting of an anti-oxidant, a heat stabilizer, a light stabilizer, a plasticizer, an antistatic agent, a nucleating agent, a flame retardant, a lubricant, an impact modifier, an optical brightener, an ultraviolet absorber, a pigment and a dye.

A method of preparing the molded article may include, for example, mixing the copolycarbonate resin of the present disclosure and an additive such as an anti-oxidant well using a mixer, extrusion molding the mixture with an extruder to prepare a pellet, drying the pellet well, and then injecting the pellet with an injection molding machine.

Hereinafter, preferred Examples will be provided in order to assist in the understanding of the present disclosure. However, it will be obvious that the following Examples are only illustrative of the present disclosure, and various modifications and alterations may be made within the scope and technical idea of the present disclosure, and also it will be natural that these modifications and alterations may fall within the scope of the appended claims, to those skilled in the art.

EXAMPLES

Preparation Example 2-methyl-1-butene hydroxybenzoate (hereinafter, referred to as MBHB) was prepared in the following way:

In a 500 ml round flaks, 40 g (222 mmol) of 4-acetoxybenzoic acid was added, and dissolved in methylene chloride, then 31 g (244 mmol) of oxalyl chloride and 1 to 5 drops of DMF were added to carry out a reaction for 3 hours or more. Reaction completion was confirmed by TLC (thin layer chromatograph), and when the reaction was completed, evaporation was carried out to obtain a material wherein the hydroxy group of 4-acetoxybenzoic acid is chlorinated. The material was added to a flask including 19.1 g (222 mmol) of 2-methyl-1-buten-4-ol and 44 g (444 mmol) of TEA (triethylamine) being dissolved in ethylacetate, and reaction was carried out, and the product was filtered to obtain a solvent which was then evaporated. The remaining material after the evaporation was dissolved in MeOH (methyl alcohol), and then 12.6 g (233 mmol) of sodium methoxide was added to carry out a reaction for 1 hour or more. After reaction completion, an ion exchange resin was used to filter the product, which was column-purified to obtain a final product, MBHB. The structure of the obtained MBHB was confirmed by $^1H$ NMR and $^{13}C$ NMR.

Example 1

Preparation of Siloxane Compound Corresponding to Chemical Formula 1

47.60 g (160 mmol) of octamethylcyclotetrasiloxane and 2.40 g (17.8 mmol) of tetramethyldisiloxane were mixed, and the mixture was added to a 3 L flask with 1 part by weight of acid clay (DC-A3), based on 100 parts by weight of octamethylcyclotetrasiloxane, and reaction was carried out at 60° C. for 4 hours. After reaction completion, the product was diluted with ethylacetate, and rapidly filtered using celite. The number of repeating units (n) of the thus-obtained unmodified polyorganosiloxane was confirmed by $^1$H NMR to be 35.

To the obtained terminal-unmodified polyorganosiloxane, 4.81 g (35.9 mmol) of 2-allylphenol and 0.01 g (50 ppm) of a Karstedt's platinum catalyst were added to be reacted at 90° C. for 3 hours. After reaction completion, unreacted siloxane was removed by evaporation under the condition of 120° C. and 1 torr. The thus-obtained terminal modified polyorganosiloxane, that is, the siloxane compound represented by Chemical Formula 1 was light yellow oil, having the number of repeating unit (n) of 35, and did not require further purification. The preparation of the siloxane compound corresponding to Chemical Formula 1 (hereinafter, referred to as AP-PDMS) was confirmed by $^1$H NMR.

Preparation of Siloxane Compound Corresponding to Chemical Formula 2

A siloxane compound corresponding to Chemical Formula 2 (hereinafter, referred to as MBHB-PDMS) having the number of repeating groups (m) of 45, was prepared in the same manner as above <Preparation of Siloxane Compound Corresponding to Chemical Formula 1>, except that 6.13 g (29.7 mmol) of MBHB (2-methyl-1-butene hydroxybenzoate) was used instead of 2-allylphenol.

Preparation of Copolycarbonate Resin

In a polymerization reaction, 1784 g of water, 385 g of NaOH, and 232 g of BPA (bisphenol A) were mixed and dissolved under $N_2$ atmosphere. 4.3 g of PTBP (para-tert butylphenol) and a mixed solution of 5.91 g of AP-PDMS and 0.66 g of MBHB-PDMS (weight ratio of 90:10) were dissolved in MC (methylene chloride) and added. Next, 128 g of TPG (triphosgene) was dissolved in MC and added for 1 hour while pH was maintained to be 11 or more, and then 46 g of TEA (triethylamine) was added 10 minutes later to generate a coupling reaction. After total reaction time of 1 hour and 20 minutes, pH was lowered to 4 to remove TEA, and the product was washed 3 times with distilled water to produce a polymer of which the pH was then adjusted to 6-7 (neutral). The thus-obtained polymer was subjected to reprecipitation in a mixed solution of methanol and hexane, and then dried at 120° C. to obtain a final copolycarbonate resin.

The obtained copolycarbonate resin was confirmed to have a weight average molecular weight of 33000 g/mol as measured by GPC using PC standard.

Preparation of Injected Specimen

To the prepared copolycarbonate resin, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added and pelletized using HAAKE Mini CTW with a vent attached, and a HAAKE Minijet injection molding machine was used in injection molding at a cylinder temperature of 300° C. and a mold temperature of 120° C. to prepare an Izod specimen, and a disk (1.5 mm height, 40 mm diameter) was used to prepare a Haze specimen.

Example 2

A cocarbonate resin and an injected specimen thereof were prepared in the same manner as above Example 1, except that 6.24 g of 2-allylphenol-substituted-siloxane (AP-PDMS) and 0.33 g of MBHB-substituted-siloxane (MBHB-PDMS) (weight ratio of 95:5) were used. Herein, the copolycarbonate resin was confirmed to have a weight average molecular weight of 33000 g/mol.

Example 3

A cocarbonate resin and an injected specimen thereof were prepared in the same manner as above Example 1, except that 5.25 g of 2-allylphenol-substituted-siloxane (AP-PDMS) and 1.32 g of MBHB-substituted-siloxane (MBHB-PDMS) (weight ratio of 80:20) were used. Herein, the copolycarbonate resin was confirmed to have a weight average molecular weight of 33000 g/mol.

Example 4

A cocarbonate resin and an injected specimen thereof were prepared in the same manner as above Example 1, except that 3.285 g of 2-allylphenol-substituted-siloxane (AP-PDMS) and 3.285 g of MBHB-substituted-siloxane (MBHB-PDMS) (weight ratio of 50:50) were used. Herein, the copolycarbonate resin was confirmed to have a weight average molecular weight of 33000 g/mol.

Comparative Example 1

A copolycarbonate resin and an injected specimen thereof were prepared in the same manner as above Example 1, except that AP-PDMS was not used and only 6.57 g of MBHB-PDMS was used in preparation of the copolycarbonate resin. Herein, the copolycarbonate resin was confirmed to have a weight average molecular weight of 33000 g/mol.

Comparative Example 2

A copolycarbonate resin and an injected specimen thereof were prepared in the same manner as above Example 1, except that MBHB-PDMS was not used and only 6.57 g of AP-PDMS was used in preparation of the copolycarbonate resin. Herein, the copolycarbonate resin was confirmed to have a weight average molecular weight of 33000 g/mol.

Experimental Example

The characteristics of the injected specimen of the copolycarbonate resin prepared in above Examples 1 to 4 and Comparative Examples 1 and 2 were measured in the following manner, and the results were shown in following Table 1.

Room temperature impact strength: measured at 23° C. according to ASTM D256 (⅛ inch, Notched Izod).

Low-temperature impact strength: measured at −30° C. according to ASTM D256 (⅛ inch, Notched Izod).

Haze: measured according to ASTM D1003.

Weight average molecular weight (g/mol): measured by weighing with PC standard using Agilent 1200 series.

Flowability (Ml): measured according to ASTM D1238 (300° C., 1.2 kg condition)

Repeating unit: measured by $^1$H-NMR using Varian 500 MHz.

TABLE 1

| Classification | Room temperature impact strength | Low-temperature impact strength | Transparency (%) | MI |
|---|---|---|---|---|
| Example 1 | 76.9 | 75.1 | 1.1 | 14 |
| Example 2 | 80.1 | 71.3 | 1.0 | 15 |
| Example 3 | 79.1 | 65.5 | 1.2 | 12 |
| Example 4 | 67.2 | 62.5 | 1.3 | 10 |
| Comparative Example 1 | 65.1 | 58.2 | 1.4 | 8 |
| Comparative Example 2 | 56.8 | 17.5 | 0.6 | 30 |

As described in above Table 1, it may be confirmed that the copolycarbonate resin of the present disclosure (Examples 1 to 4) had excellent low-temperature impact strength, as compared with the copolycarbonate resin without the siloxane compound according to the present disclosure (Comparative Examples 1 and 2), and also excellent transparency and flowability against low-temperature impact strength.

The invention claimed is:

1. A copolycarbonate resin polymerized with an aromatic diol compound, a carbonate precursor and a siloxane compound, wherein the siloxane compound is a mixture of a compound represented by following Chemical Formula 1 and a compound represented by following Chemical Formula 2:

[Chemical Formula 1]

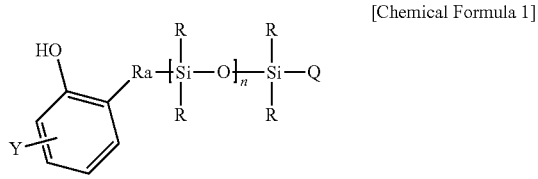

wherein R is independently hydrogen or an alkyl group having 1 to 13 carbon atoms; Ra is an alkylene group having 1 to 10 carbon atoms; Y is an alkyl group having 1 to 6 carbon atoms, hydrogen (H), halogen, a hydroxy group, an alkoxy group or an aryl group having 6 carbon atoms or more; -Q is —OH, —OR''' or

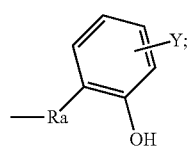

n is an integer of 1 to 99; and R''' is an alkyl group having 1 to 12 carbon atoms;

[Chemical Formula 2]

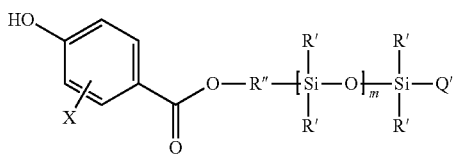

wherein R' is independently hydrogen or an alkyl group having 1 to 13 carbon atoms; R'' is an alkylene group having 1 to 10 carbon atoms; X is an alkylene group having 1 to 6 carbon atoms, hydrogen (H), halogen, a hydroxy group, an alkoxy group or an aryl group having 6 carbon atoms or more; -Q' is —OH, —OR''' or

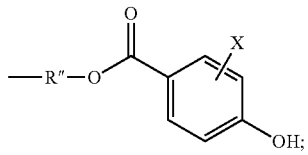

m is an integer of 1 to 99; and R''' is an alkyl group having 1 to 12 carbon atoms.

2. The copolycarbonate resin of claim 1, wherein a weight ratio between the compound represented by Chemical Formula 1 and the compound represented by Chemical Formula 2 is 0.1:99.9 to 99.9:0.1.

3. The copolycarbonate resin of claim 1, wherein the siloxane compound is included in 0.1 to 10% by weight.

4. The copolycarbonate resin of claim 1, wherein the aromatic diol compound is one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulphide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlororophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane and α,ω-bis[3-(o-hydroxyphenyl)propyl]polydimethylsilioxane.

5. The copolycarbonate resin of claim 1, wherein the carbonate precursor is a compound represented by Chemical Formula 3:

[Chemical Formula 3]

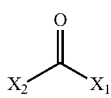

wherein $X_1$ and $X_2$ are independently halogen, a haloalkyl group, a halocycloalkyl group, a haloaryl group, an alkoxy group or a haloalkoxy group.

6. The copolycarbonate resin of claim 1, wherein the compound represented by Chemical Formula 2 is a compound represented by following Chemical Formula 5:

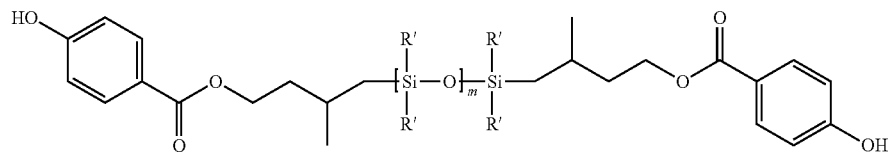

[Chemical Formula 5]

wherein R' is independently hydrogen or an alkyl group having 1 to 13 carbon atoms; and m is an integer of 1 to 99.

7. The copolycarbonate resin of claim 1, wherein the copolycarbonate resin is polymerized by further comprising a molecular weight controller.

8. The copolycarbonate resin of claim 7, wherein the molecular weight controller is mono-alkylphenol.

9. The copolycarbonate resin of claim 7, wherein the molecular weight controller is included in 0.1 to 10 parts by weight, based on 100 parts by weight of the aromatic diol compound.

10. The copolycarbonate resin of claim 1, wherein the copolycarbonate resin has a weight average molecular weight of 30000 to 60000 g/mol.

11. A molded article comprising the copolycarbonate resin of claim 1.

12. The molded article of claim 11, wherein the molded article is an injection molded article.

13. A method of preparing a copolycarbonate resin by interfacial polymerization of an aromatic diol compound, a carbonate precursor and a siloxane compound, wherein the siloxane compound is a mixture of a compound represented by following Chemical Formula 1 and a compound represented by following Chemical Formula 2:

[Chemical Formula 1]

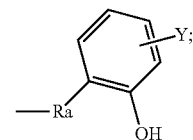

wherein R is independently hydrogen or an alkyl group having 1 to 13 carbon atoms; Ra is an alkylene group having 1 to 10 carbon atoms; Y is an alkyl group having 1 to 6 carbon atoms, hydrogen (H), halogen, a hydroxy group, an alkoxy group or an aryl group having 6 carbon atoms or more; -Q is —OH, —OR''' or

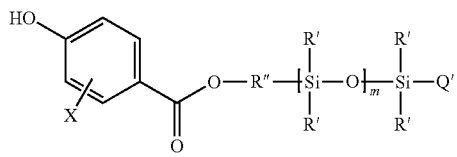

n is an integer of 1 to 99; and R''' is an alkyl group having 1 to 12 carbon atoms;

[Chemical Formula 2]

wherein R' is independently hydrogen or an alkyl group having 1 to 13 carbon atoms; R'' is an alkylene group having 1 to 10 carbon atoms; X is an alkylene group having 1 to 6 carbon atoms, hydrogen (H), halogen, a hydroxy group, an alkoxy group or an aryl group having 6 carbon atoms or more; -Q' is —OH, —OR'''' or m is an integer of 1 to 99; and R'''' is an alkyl group having 1 to 12 carbon atoms.

14. The method of claim 13, wherein a molecular weight controller is added before, during or after polymerization initiation.

15. The method of claim 13, wherein the interfacial polymerization is carried out by further including one or more of an acid binder, an organic solvent and a reaction promoter.

* * * * *